D. MAUS.
MACHINE FOR CUTTING TRIMMINGS.
APPLICATION FILED JUNE 8, 1908.
963,453.
Patented July 5, 1910.
3 SHEETS—SHEET 1.
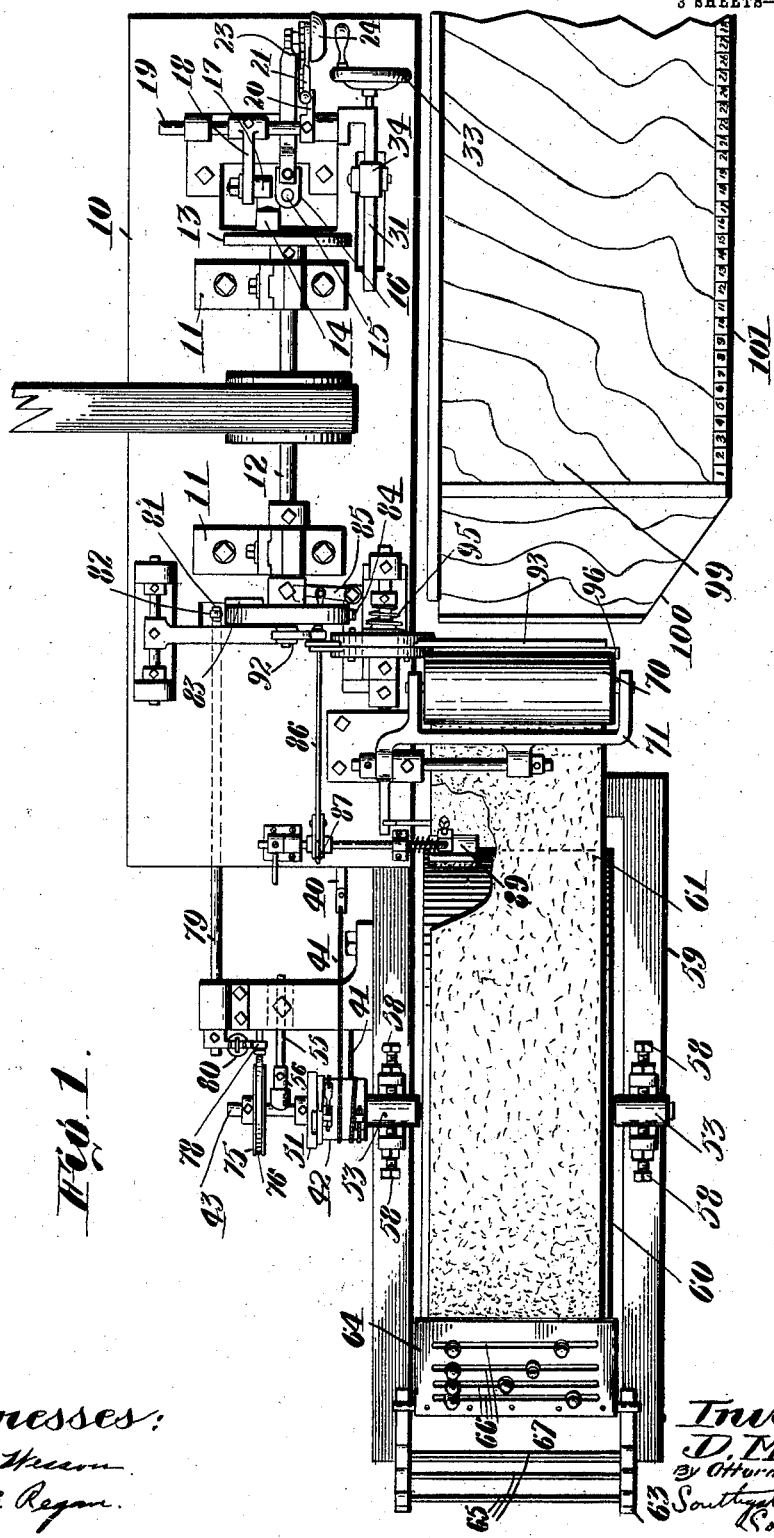

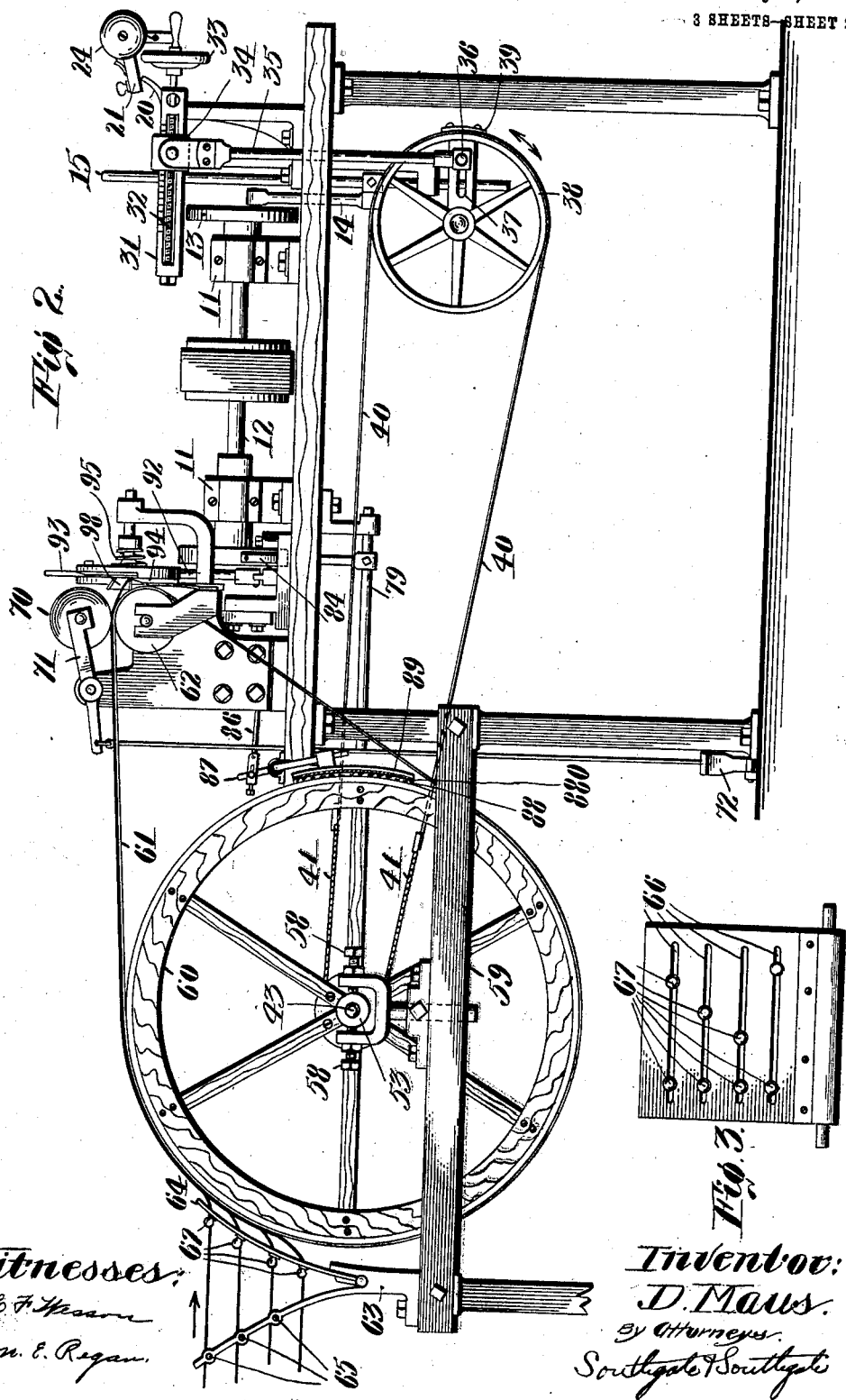

D. MAUS.
MACHINE FOR CUTTING TRIMMINGS.
APPLICATION FILED JUNE 8, 1908.
963,453.
Patented July 5, 1910.
3 SHEETS—SHEET 2.
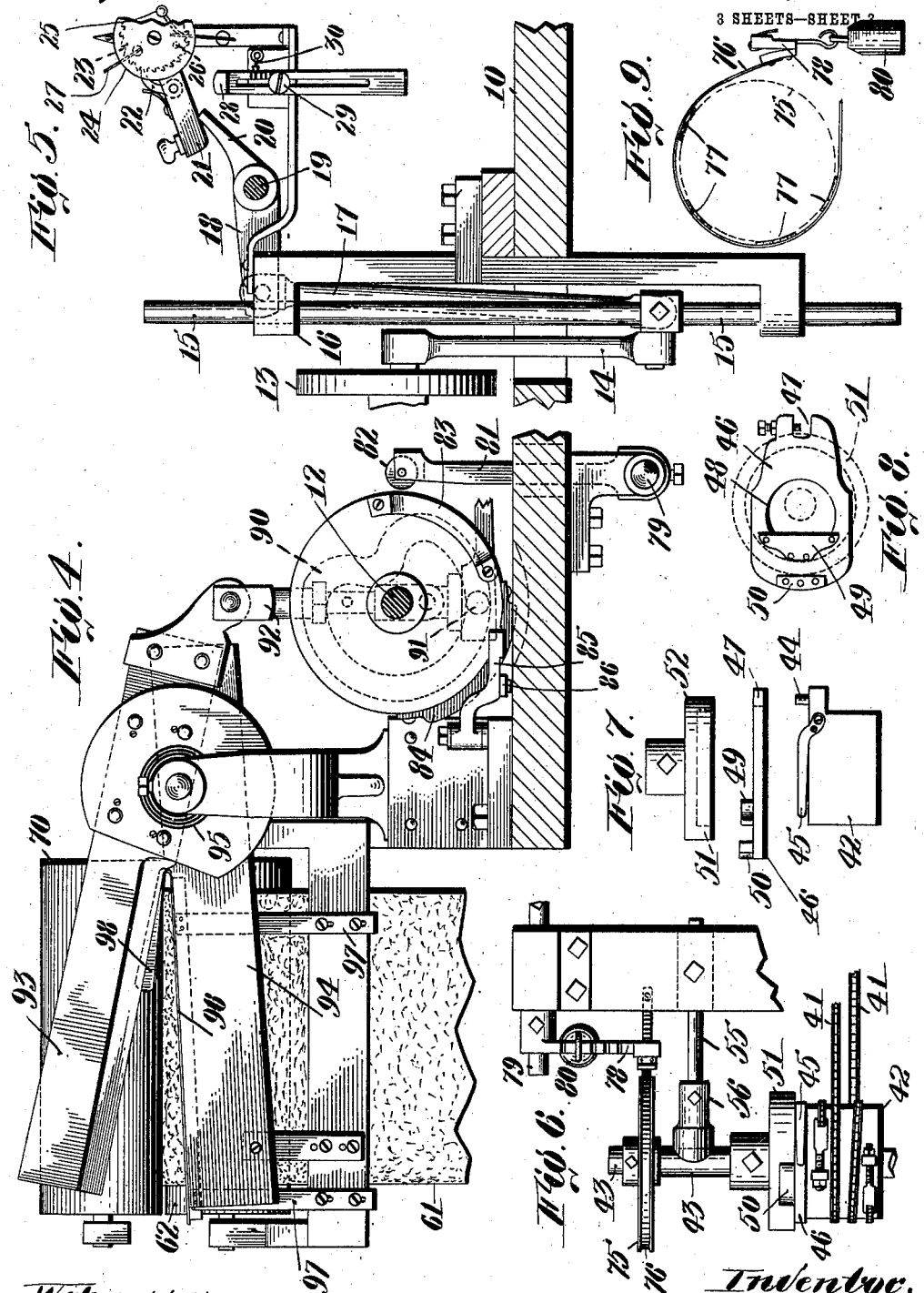

UNITED STATES PATENT OFFICE.

DANIEL MAUS, OF WORCESTER, MASSACHUSETTS.

MACHINE FOR CUTTING TRIMMINGS.

963,453.  Specification of Letters Patent.  Patented July 5, 1910.

Application filed June 3, 1908. Serial No. 437,282.

*To all whom it may concern:*

Be it known that I, DANIEL MAUS, a citizen of the United States, residing at Worcester, in the county of Worcester and State of Massachusetts, have invented a new and useful Machine for Cutting Trimmings, of which the following is a specification.

This invention relates to a machine for feeding trimmings such as hamburg, lace, edging and the like and cutting them off in predetermined lengths.

The principal objects of the invention are to provide means whereby such materials can be cut off in an expeditious and accurate manner and fed forward so as to keep them in a flat and unrumpled condition and deliver them in a convenient manner to a receiving table; also to provide for proper guides for material of this class and devices for regulating the tension, adjusting the feed, and for registering the number of pieces cut and delivered.

Further objects and advantages of the invention will appear hereinafter.

Reference is to be had to the accompanying drawings which show one form in which the invention may be embodied and in which, Figure 1 is a plan thereof. Fig. 2 is a side view of the machine with the delivery table omitted. Fig. 3 is an end elevation of a guide for delivering the material to the machine. Fig. 4 is a front view of the cutting mechanism, parts appearing in section.
Fig. 5 is a side view of part of the mechanism for driving the feeding device and counting mechanism therefor. Fig. 6 is a plan on enlarged scale of part of the feeding mechanism. Fig. 7 is a plan of one element of the feeding mechanism showing the parts separated. Fig. 8 is an elevation of one of the elements thereof, and Fig. 9 is an end view of the friction employed on said friction mechanism.

The machine is designed to feed one or more pieces of material over an endless carrier which is operated by a drum to a cutting device which is operated intermittently to cut off the material and deliver the same in lengths to a delivery table from which it may be removed by hand. At the same time the pieces delivered are counted.

Referring to the drawings in detail, the machine is provided with a frame or support 10 on which are mounted bearing blocks 11 carrying a main driving shaft 12 designed to be operated in any convenient manner. On this shaft is mounted a crank-wheel 13 provided with a pitman 14 which is pivotally connected with a vertically sliding rod 15 operating in guides 16 secured to the table. To this rod is connected a pitman 17 operating an arm 18 fixed to an oscillating shaft 19. The number of oscillations of this shaft determines the number of cutting and feeding operations and consequently the device may be caused to register that number by providing a projection 20 connected with the shaft 19 or arm 18 and adapted to operate a swinging arm 21 having a spring pressed pawl 22 coöperating with a ratchet wheel 23, which is mounted to turn near a bell 24, having a clapper 25. A pin 26 is mounted on the ratchet wheel for operating the clapper at the completion of a revolution, thus showing that a certain number of pieces have been cut and delivered. In starting the machine, a pointer 27 on the wheel is set to the zero point and when the wheel has turned once around the bell will sound. The distance which the swinging arm drops on each oscillation is governed by the position of an adjustable bar 28 which is adapted to be fixed in adjusted position by a screw 29. This bar is preferably provided with a scale coöperating with a pointer 30 to show how the counting mechanism will indicate the operation of the machine. If the bar 28 is set in its uppermost position, the arm 21 will operate the ratchet wheel one notch during each oscillation so that if there are twenty-four teeth on the ratchet wheel, the sounding of the bell will show twenty-four cuts, but it can be lowered so it will turn it two or any desired number of notches every time the machine operates. The counting device is supported by a bracket carried on the guide 16.

The shaft 19 is provided at its end with a yoke 31 having a screw 32 thereon which is adapted to be turned in bearings on the yoke by means of a hand-wheel 33. A screw threaded block 34 is mounted on the yoke to slide back and forth as the screw is rotated and it is provided with a pivotally connected pitman 35 which is adjustably connected by means of a screw 36 and slot 37 with an oscillating wheel 38. The yoke 31 has a scale to show the length of cut for which the block 34 is set. It will be seen, therefore, that according to the adjustment of the screws 32 and 36, the constant rotation of the shaft 12 will cause the wheel 38 to be oscillated through greater or smaller distances. The wheel 38 is provided with a plate 39 by which a steel tape or belt 40 is secured to it. This tape 40 is connected with a pair of chains 41 which pass in opposite directions around a hub 42 and are adjustably fixed thereto as is indicated in Fig. 6. The oscillations of the wheel 38 consequently oscillate the hub 42 in a similar manner but the motion is somewhat multiplied if the hub is smaller than the wheel, as indicated in the drawings. This hub is intended to oscillate a shaft 43 which freely passes through the hub. For this purpose the hub is provided with an eccentric pivot pin 44 and with a spring 45. On this pivot pin is oscillatably mounted a plate 46 having a slot 47 for receiving the pin 44 so that the plate can turn about said pin. This plate is constantly pressed upon by the spring 45 and is provided with an opening 48 to allow the shaft freely to pass through it. The plate is also provided with a pair of jaws 49 and 50 spaced from each other so as to permit a circular or annular wall or edge 51 on a disk 52 to pass between the jaws ordinarily without binding. This disk is fixed to the shaft 43. Now it will be seen that when the wheel 38 is turned in one direction the spring 45 will hold the plate 46 in such position that this turning motion of the hub 42 will not be communicated to the shaft. When, however, the wheel 38 is turned in the other direction, the pin 44 is moved so as to turn the jaws 49 and 50 in such a way as to clamp the edge or wall 51 of the disk 52 between them and thus turn that disk and take the shaft with it. On account of the fact that this end of the shaft 43 is at a considerable distance from the bearings 53 which are the main support of the shaft, a rod 55 is fixed to the frame of the machine and is provided with a head 56 having a concave partial bearing in the end thereof for engaging the shaft. This head is slightly adjustable and acts as a bearing to steady the shaft without necessitating the provision of a complete bearing for that purpose. The bearings 53 are adjustably mounted by means of screws 58 on an extension 59 of the frame 10 and between these bearings is located a drum 60 which is provided with an endless belt 61 passing over a pulley 62 for moving one or more pieces of hamburg or other material to be fed. This is guided into proper position on the endless belt 61 by means of a bracket 63 located in fixed position on the frame 59 and a pivoted guide member 64. The bracket has a plurality of horizontal cross bars 65 at different heights for supporting the work. The guide consists of a plate having a plurality of slots 66 therein preferably arranged horizontally, and at substantially the same height as the bars 64. Each slot is provided with a pair of buttons 67, either one or both of which may be adjustable so that the space between them can be regulated to accommodate simultaneously a plurality of pieces of material of varying widths as indicated in Fig. 3. When the material is placed in the machine, the plate 64 can be swung back on its pivot against the bracket so that the material can be threaded through the guides and brought up on to the endless belt 61. A roller 70 preferably is employed pressing on the pulley 62 by gravity to keep the material taut. This roller is mounted on a lever 71 operated by a treadle 72 in an obvious manner to move it away from the pulley to permit new material to be placed in it.

For the purpose of providing proper tension on the shaft 43 during its forward motion and also to prevent it from moving in the wrong direction during the reverse oscillation of the hub 42 the former has near the end thereof a friction wheel 75 about which a friction belt 76 is placed. This belt has one end fixed in stationary position and in order to provide an improved friction surface it has a series of separated strips of leather or the like 77. This is an improvement over the form of friction belts in which the bearing surface is continuous, as it permits the pressure to be concentrated and increases the efficiency of the friction. The free end of the belt is connected with a lever or arm 78 fixed to an oscillating shaft 97 and having a weight 80 adjustably mounted thereon to regulate the friction. This shaft 79 has an arm 81 provided with a cam roller 82 caused by the weight to engage an edge cam 83 on the driving shaft 12. When the projecting portion of said cam engages the roller 82 it turns the shaft and positively pulls the friction belt against the friction wheel 75. This projecting portion of the cam is so placed as to cause the friction to be applied nearly all the time when the hub 42 is turning, but it is released for a short time when the drum is starting to rotate so that there will be no resistance to prevent an easy start. It is then again applied to keep the tension right and stays on during the reverse motion of the hub to prevent the drum from reversing. On the shaft 12 are also another pair of cams, or rather all three cams are arranged in one structure in the form shown in the drawings. A face cam 84 is adapted to engage an oscillating lever 85 once during each revolution. It is connected by a rod 86 that is adjustably fixed to a lever 87 which is provided with a brake-shoe 89 for applying a brake to the drum 60 for a short period just as the crank wheel reaches a dead center, to stop the drum at the right point and not allow its inertia to carry it beyond the point at which it should stop. The brake 89 has a rubber cushion 88 and a leather face 880. The third cam 90 on the shaft 12 positively operates a cam roll 91 connected with the link 92 which operates a cutting blade 93. This blade coöperates with a stationary blade 94 fixed on the machine and is provided with a spring 95 for holding it up to cutting position. It will be observed that these two blades are exactly alike so that they are interchangeable and if one wears more than the other they can be changed about so as to equalize the wear. The operation of the movable blade is positive in both directions and takes place once during each rotation of the shaft 12 and after each feeding motion of the endless belt.

For the purpose of guiding the material from the endless belt to the knives, a small guide 96 is employed fixed on supports 97. The work falls over the pulley 62 into this guide and is caused by it to project out over the stationary blade where it will be properly cut by the movable blade. In order to provide for keeping back the work as it moves upwardly and prevent any crumpling up of the material, the guide 96 is provided with an upwardly projecting arm 98 against which the blade moves as it withdraws from the other blade to detach the work from it if it sticks. The work then falls down on the delivery table 99 which is preferably provided with a slanting guide 100 at one end and with a scale 101 along the side upon which the work may be measured to see if the scale on the yoke 31 registers correctly.

While I have illustrated and described a preferred form of the invention, I am aware that many modifications may be made therein by any person skilled in the art without departing from the scope of the invention as expressed in the claims. Therefore, I do not wish to be limited to the particular details of construction shown, but What I do claim is:—

1. A guiding device for feeding strips of material comprising a plate having horizontal slits therethrough, and buttons adjustably mounted in said slits to regulate the passage of the material therethrough.

2. A guiding device for feeding strips of material comprising a plate having horizontal slits therethrough, buttons adjustably mounted in said slits to regulate the passage of the material therethrough, and a stationary bracket having bars at substantially the same height as said slits for supporting the material.

3. A guiding device for the purpose described comprising a support, a horizontal bar, and a plate spaced from the bar and having an adjustable slit therein for receiving material from said bar and directing it forward, said bar and plate being located above the support.

4. A guiding device for the purpose described comprising a stationary bracket having a plurality of horizontal bars thereon at different elevations, and a pivoted plate having slits therethrough of substantially the same height as the several bars adapted to be swung over against said bracket.

5. A guiding device for the purpose described, comprising a stationary bracket having horizontal bars thereon, and a pivoted plate having slits therethrough of substantially the same height as said bars adapted to be swung over against said bracket, said slits having means slidable therealong for adjusting the effective length thereof.

6. In a machine of the character described, the combination of a guide comprising a series of horizontal supports of different elevations, a series of slits opposite said supports for guiding the material to be fed, and an endless apron for receiving the material from said slits.

7. In a machine of the character described, the combination of a feeding device adjustable horizontally to enable it to take a plurality of strips of material of different widths, and an endless intermittently operating apron adapted to take material from said feeding device.

8. In a machine of the character described, the combination of a feeding device having a plurality of means at different elevations for guiding strips of material, an endless apron for receiving strips from said guiding devices, and means for intermittently operating said apron.

9. In a machine of the character described, the combination of a feeding device having a curved surface provided with horizontal slits therein for feeding material, a large drum arranged adjacent to said feeding device and on the concave side thereof, and means connected with said drum for simultaneously feeding a plurality of strips from said feeding device.

10. In a machine of the character described, the combination of a drum, means for rotating said drum intermittently, a pulley, an endless apron passing over the drum and pulley and having its upper strands substantially horizontal, and means for cutting off the material delivered from said apron.

11. In a machine of the character described, the combination of a drum, means for rotating said drum intermittently, a pulley, an endless apron passing over the drum and pulley and having its upper strand substantially horizontal, a roller located over said pulley and adapted to bear upon the material supported thereby, and means for lifting said roller from the pulley to permit the work to be inserted.

12. In a machine of the character described, the combination of an endless apron, means for moving it intermittently, a pulley over which the feeding portion of said apron turns, a guide for receiving material from said feeding apron, and a pair of cutting blades located adjacent to said guide.

13. In a machine of the character described, the combination of an endless apron, means for moving it intermittently, a pulley over which the feeding portion of said apron turns, a guide for receiving material from said feeding apron, a pair of cutting blades located adjacent to said guide, and a stationary stripper located in position to detach material from the moving cutting blade.

14. In a machine of the character described, the combination of an endless apron, means for moving it intermittently, a pulley over which the feeding portion of said apron turns, a guide for receiving material from said feeding apron, a pair of cutting blades located adjacent to said guide, and a delivery table adapted to receive the work from said guide when severed, said table having a scale along the edge thereof.

15. In a machine of the character described, the combination of a feed apron, means for moving it intermittently, a support over which the feeding portion of said apron turns, a guide for receiving material from said feeding apron, a cutter located adjacent to said guide, and a delivery table adapted to receive the work from said guide when severed, said table having a scale along the edge thereof.

16. In a machine of the character described, the combination of a feed apron, means for moving it intermittently, a support over which the feeding portion of said apron turns, a guide for receiving material from said feeding apron, a cutter located adjacent to said guide, and a stationary stripper located in position to detach material from the moving cutter.

17. In a machine of the character described, the combination of a drum, an endless apron operated thereby, means for intermittently rotating said drum, a cutter adapted to cut material delivered from the apron, a brake for the drum, and means for operating the cutter and for operating said brake.

18. In a machine of the character described, the combination of a drum, an apron adapted to be operated thereby, a cutting device, a brake for said drum, a shaft on which the drum is mounted, a friction brake for said shaft, and a cam having means for operating said cutting device and both of said brakes.

19. In a machine of the character described, the combination of a drum, an apron adapted to be operated thereby, a cutting device, a brake for said drum, a shaft on which said drum is mounted, a friction brake for said shaft, and means for intermittently operating said cutting device and both of said brakes when said drum is in motion.

20. In a machine of the character described, the combination of a drum, a feeding apron adapted to be moved by said drum, a cam, a lever operated by the cam, an adjustable link, and a brake for said drum adjustably connected with said link.

21. In a machine of the character described, the combination of a drum, an apron operated thereby, a shaft on which the drum is mounted, a friction wheel on the shaft, a friction brake on said wheel, an arm connected with the free end of said friction brake, and having an adjustable weight thereon, and means for positively moving said arm to apply the brake.

22. In a machine for cutting sheet material, the combination with a drum, an apron operated thereby, and a shaft on which the drum is mounted, of a friction wheel on the shaft, a flexible friction device therefor having a series of friction surfaces thereon separated from each other and engaging said wheel, and means for positively operating said friction device.

23. In a machine for cutting sheet material, the combination with a drum and an apron operated thereby, of a shaft for supporting the drum, a friction wheel thereon, a brake extending around the friction wheel and having a series of leather friction surfaces separated from each other and bearing on the wheel, an arm connected with the free end of said brake, and means for positively operating said arm to apply the brake when said shaft is about to stop.

24. In a machine of the character described, the combination of a shaft, adjustable bearings for said shaft, a friction wheel on the end of said shaft, means for operating the shaft located between the friction wheel and bearings, and a support for the shaft located between said means and the friction wheel.

25. In a machine of the character described, the combination of a shaft, bearings for supporting said shaft, a steadying device for the shaft beyond the bearings, and means located between the bearings and said steadying device for driving the shaft, said means comprising a disk fixed to the shaft, a hub freely rotatable on the shaft, means for oscillating said hub, and means for causing the motion of the hub in one direction to rotate the disk, said means being inoperative when the hub is moving in the other direction.

26. In a machine of the character described, the combination of a shaft, a disk fixed thereto having an annular edge, a hub freely rotatable on the shaft, means for oscillating said hub, and a plate pivoted eccentrically on the hub and having jaws for clamping the edge of said disk with respect to the hub when the hub rotates in one direction only.

27. In a machine of the character described, the combination of a shaft, a disk fixed thereto having an annular edge, a hub freely rotatable on the shaft, means for oscillating said hub, a plate pivoted eccentrically on the hub and having jaws for clamping the edge of said disk with respect to the hub when the hub rotates in one direction only, and a spring on the hub for normally keeping said plate in such position that the jaws will not clamp the disk thereto.

28. In a device of the character described, the combination of a disk having an annular edge, a rotatable hub having an eccentric pivot-pin thereon, a plate between the hub and disk having a notch for receiving said pin and having jaws located on the opposite side thereof for engaging the edge of the disk, and a spring on the hub for engaging the plate and normally holding it in inoperative position.

29. In a device of the character described, the combination of a drum having a head, an oscillatable wheel, a belt for transmitting the oscillations of the wheel in one direction to the hub, said means being inoperative when the wheel moves in the other direction, a driving shaft, and means adjustably connected with the driving shaft for oscillating said wheel.

30. In a machine of the character described, the combination of a driving shaft, a crank wheel thereon, a sliding rod operated by the crank wheel, an adjusting screw adapted to be oscillated by said sliding rod, a block adapted to be adjusted by said screw, and a wheel adjustably connected with said block and adapted to be oscillated by the motion thereof.

31. In a machine of the character described, the combination of a driving shaft, a sliding rod adapted to be reciprocated by the rotation of said driving shaft, a rock shaft, means connected with said rod for rocking said rock shaft, a yoke fixed to said rock shaft, a screw adapted to turn said yoke, a block mounted to engage said screw and slide on the yoke, a pitman connected with said block, and a wheel adjustably connected with said pitman and adapted to be oscillated thereby.

32. In a machine of the character described, the combination of a driving shaft, a wheel, an adjustable belt connected with the driving shaft for oscillating said wheel when the shaft rotates, and a counting device operated by the driving shaft.

33. In a machine of the character described, the combination of a driving shaft, an oscillatable adjusting screw, means operated by the driving shaft for oscillating said adjusting screw, a block connected with said screw and adapted to be adjusted thereby, and a wheel adjustably connected with said block and adapted to be oscillated by the motion thereof.

34. In a device of the character described, the combination of a driving shaft, a wheel, means connected with the driving shaft for oscillating said wheel, a counting mechanism, means connected with the driving shaft for operating the counting mechanism once for each oscillation of the wheel, a feed apron connected with said wheel, a cutting device, and means connected with said driving shaft for operating the cutting device.

35. In a device of the character described, the combination of a driving shaft, a wheel, means connected with the driving shaft for oscillating said wheel, a counting mechanism, means connected with the driving shaft for operating the counting mechanism once for each oscillation of the wheel, a feed apron connected with said wheel, a cutting device, means connected with said driving shaft for operating the cutting device, a brake for said wheel, and means connected with the driving shaft for operating said brake when the apron is about to stop.

36. In a machine for cutting sheet material, the combination of a driving shaft, a drum, means for guiding sheet material to and from the drum, means connected with the driving shaft for oscillating said drum, a cutting device located in the path of the sheet material from the drum, means connected with said driving shaft for operating the cutting device, a brake for said drum, means connected with the driving shaft for operating said brake, a friction brake for the shaft of said drum, and means connected with said driving shaft for operating said friction brake.

37. In a device of the character described, the combination of a driving shaft, a drum, means connected with the driving shaft for oscillating said drum, a counting mechanism, means connected with the driving shaft for operating the counting mechanism once for each oscillation of the drum, a cutting device, means connected with said driving shaft for operating the cutting device, a brake for said drum, means connected with the driving shaft for operating said brake when the drum is about to stop, a friction brake for the shaft of said drum, and means connected with said driving shaft for removing said friction brake when the drum is about to start.

38. In a machine for cutting sheet material, the combination of a driving shaft, a cutting device, means connected with the driving shaft for operating the cutting device, a drum, means connected with the driving shaft for oscillating said drum, a brake for said drum, means connected with the driving shaft for operating said brake when the drum is about to stop, a friction brake for the shaft of said drum, and means connected with said driving shaft for removing said friction brake when the drum is about to start.

39. In a machine for cutting sheet material, the combination of a driving shaft, a cutting device, means connected with the driving shaft for operating the cutting device, a drum, means connected with the driving shaft for oscillating said drum, a friction brake for the shaft of said drum, and means connected with said driving shaft for removing said friction brake when the drum is about to start.

40. In a machine for cutting sheet material, the combination of a driving shaft, a cutting device, means connected with the driving shaft for operating the cutting device, a drum, means connected with the driving shaft for oscillating said drum, a brake for said drum, means connected with the driving shaft for operating said brake when the drum is about to stop.

41. In a machine for cutting sheet material, the combination of a driving shaft, a cutting device, means connected with the driving shaft for operating the cutting device, a drum, means connected with the driving shaft for oscillating said drum, a brake for said drum, means connected with the driving shaft for operating said brake when the drum is about to stop, said brake comprising a friction surface and a yielding cushion behind it.

In testimony whereof I have hereunto set my hand, in the presence of two subscribing witnesses.

DANIEL MAUS.

Witnesses:
 A. E. VAY,
 E. M. ALLEN.

Correction in Letters Patent No. 963,453.

It is hereby certified that Letters Patent No. 963,453, granted July 5, 1910, upon the application of Daniel Maus, of Worcester, Massachusetts, for an improvement in "Machines for Cutting Trimmings," were erroneously issued to the inventor, said Maus, whereas said Letters Patent should have been issued to *Elizabeth Maus, executrix* of said Daniel Maus, deceased; and that the said Letters Patent should be read with this correction therein that the same may conform to the record of the case in the Patent Office.

Signed and sealed this 30th day of August, A. D., 1910.

[SEAL.] F. A. TENNANT,

*Acting Commissioner of Patents.*